United States Patent
Tan et al.

(10) Patent No.: US 9,626,035 B2
(45) Date of Patent: Apr. 18, 2017

(54) OLED PIXEL CIRCUIT, DRIVING METHOD THEREOF AND DISPLAY PANEL

(71) Applicants: BOE TECHNOLOGY GROUP CO., LTD., Beijing (CN); CHENGDU BOE OPTOELECTRONICS TECHNOLOGY CO., LTD., Sichuan (CN)

(72) Inventors: Wen Tan, Beijing (CN); Xiaojing Qi, Beijing (CN); Like Hu, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan (CN)

( * ) Notice: Subject to any disclaimer, the term of this patent is extended or adjusted under 35 U.S.C. 154(b) by 118 days.

(21) Appl. No.: 14/424,789

(22) PCT Filed: Apr. 25, 2014

(86) PCT No.: PCT/CN2014/076245
§ 371 (c)(1),
(2) Date: Feb. 27, 2015

(87) PCT Pub. No.: WO2015/096329
PCT Pub. Date: Jul. 2, 2015

(65) Prior Publication Data
US 2016/0041676 A1    Feb. 11, 2016

(30) Foreign Application Priority Data
Dec. 27, 2013  (CN) .......................... 2013 1 0741569

(51) Int. Cl.
*G06F 3/041*    (2006.01)
*G06F 3/042*    (2006.01)
(Continued)

(52) U.S. Cl.
CPC ............ *G06F 3/0416* (2013.01); *G06F 3/042* (2013.01); *G06F 3/044* (2013.01); *G06F 3/0412* (2013.01);
(Continued)

(58) Field of Classification Search
CPC ...... G06F 3/0416; G06F 3/0412; G06F 3/042; G06F 3/044; G06F 2203/04103;
(Continued)

(56) References Cited

U.S. PATENT DOCUMENTS

| 2005/0099372 A1* | 5/2005 | Nakamura ............ G06F 3/0412 345/79 |
| 2006/0208979 A1* | 9/2006 | Fish .................... G09G 3/3233 345/81 |
| 2010/0097354 A1 | 4/2010 | Ahn et al. |

FOREIGN PATENT DOCUMENTS

| CN | 101943974 A | 1/2011 |
| CN | 103295525 A | 9/2013 |

(Continued)

OTHER PUBLICATIONS

Chinese Office Action dated Apr. 22, 2015 corresponding to application No. 201310741569.9.
(Continued)

*Primary Examiner* — Mark Regn
(74) *Attorney, Agent, or Firm* — Nath, Goldberg & Meyer; Joshua B. Goldberg; Christopher Thomas (57) ABSTRACT

The present invention provides an organic light emitting diode pixel circuit, a driving method thereof and a display panel. The OLED pixel circuit comprises a light emitting module comprising an organic light emitting diode for emitting light; a light emitting control module for controlling the light emitting module to emit light; a driving module, so as to control the light emitting module to emit
(Continued)

light; a threshold compensation module, and a data signal input module configured for inputting a data signal; the OLED pixel circuit further comprises: a touch sensing module configured for generating a touch sensing signal; and a touch detection module configured for detecting the touch sensing signal, and providing an initial voltage for the threshold compensation module, wherein the driving module amplifies the touch sensing signal generated by the touch sensing module and then outputs it to the touch detection module.

19 Claims, 3 Drawing Sheets

(51) Int. Cl.
  *G06F 3/044* (2006.01)
  *G09G 3/3233* (2016.01)
  *G09G 3/3208* (2016.01)
(52) U.S. Cl.
  CPC ......... *G09G 3/3208* (2013.01); *G09G 3/3233* (2013.01); *G06F 2203/04103* (2013.01); *G09G 2300/0426* (2013.01); *G09G 2300/0819* (2013.01); *G09G 2300/0861* (2013.01); *G09G 2320/043* (2013.01); *G09G 2330/028* (2013.01)

(58) Field of Classification Search
  CPC ............... G09G 3/3208; G09G 3/3233; G09G 2300/0426; G09G 2300/0819; G09G 2320/043; G09G 2330/028
  USPC .......................................................... 345/173
  See application file for complete search history.

(56) References Cited

FOREIGN PATENT DOCUMENTS

| | | |
|---|---|---|
| CN | 103325343 A | 9/2013 |
| CN | 103354078 A | 10/2013 |
| CN | 103413524 A | 11/2013 |
| CN | 203300191 U | 11/2013 |
| CN | 203300192 U | 11/2013 |
| CN | 103700345 A | 4/2014 |
| JP | 2005165251 A | 6/2005 |
| KR | 20110065768 A | 6/2011 |
| KR | 1020120136745 A | 12/2012 |

OTHER PUBLICATIONS

Search Report issued in International Application No. PCT/CN2014/076245, fourteen (14) pages.

* cited by examiner

OLED PIXEL CIRCUIT, DRIVING METHOD
THEREOF AND DISPLAY PANEL

This is a National Phase Application filed under 35 U.S.C. 371 as a national stage of PCT/CN2014/076245, filed Apr. 25, 2014, and claims priority benefit from Chinese Application No. 201310741569.9, filed Dec. 27, 2013, the content of each of which is hereby incorporated by reference in its entirety.

FIELD OF THE INVENTION

The present invention relates to the field of touch technology, and in particular to an OLED pixel circuit, a driving method thereof and a display panel.

BACKGROUND OF THE INVENTION

An organic light emitting diode (OLED) display device has many advantages such as large viewing angle, fast response, high contrast, high energy efficiency, good adaptability and so on, and therefore it is used more and more widely.

Figure 1:
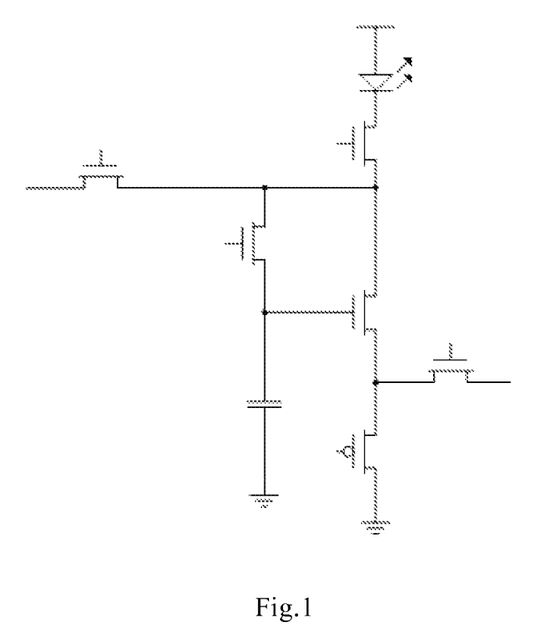
FIG. 1 is a schematic structural view of a conventional organic light emitting diode pixel circuit.

In the organic light emitting diode display device, each pixel has an organic light emitting diode, and the organic light emitting diode is controlled by a circuit on the array substrate. A basic OLED pixel circuit comprises two thin film transistors (a driving transistor and a switch transistor) and one capacitor (2T1C). In order to eliminate threshold voltage shift existing in the driving transistor, the structure of the organic light emitting diode pixel circuit is usually more complex, for example, as shown in FIG. 1, an OLED pixel circuit comprises six thin film transistors and one capacitor (6T1C).

In addition, with the development of technology, more and more display devices are provided with touch function. So-called in cell touch technology refers to that the touch control circuit is integrated in the pixel circuit, by which the products can be made light and thin, and touch reliability can be improved.

Figure 2:
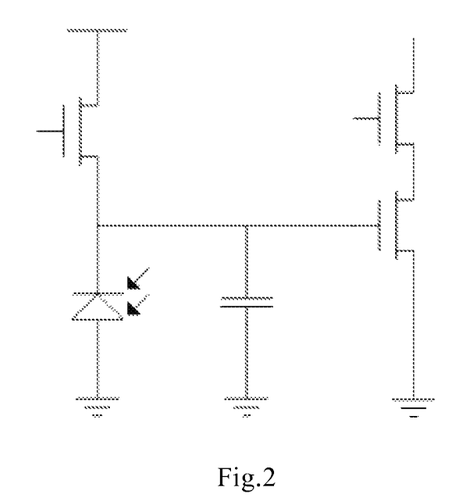
FIG. 2 is a schematic structural view of a conventional touch circuit.
Figure 3:
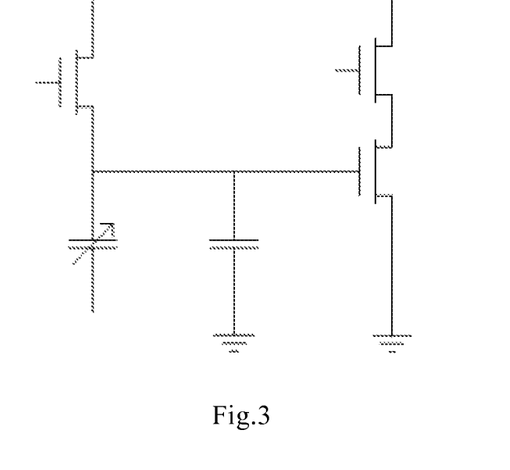
FIG. 3 is a schematic structural view of another conventional touch circuit.

A conventional touch circuit is shown in FIG. 2, wherein the photodiodes can sense light and generate a touch signal (the photodiode can be irradiated by light when no touch occurs, and the light is blocked when a touch occurs); or, another conventional touch circuit is shown in FIG. 3, when a touch occurs, the capacitance value of the sensing capacitor changes, and thereby generating a touch signal.

As described above, the touch circuit typically comprises a plurality of components, and the organic light emitting diode pixel circuit also comprises a plurality of components (e.g. 6T1C), therefore, if the touch circuit is to be integrated into the organic light emitting diode pixel circuit, there will be an excessive number of components in the organic light emitting diode pixel circuit, while the pixel has no space to accommodate so many components (especially with the resolution is increasing, and the pixel size becomes smaller, the problem becomes even more serious), thus it is difficult to apply the in cell touch technology to an organic light emitting diode display device.

SUMMARY OF THE INVENTION

In order to solve the problem that the in cell touch technology cannot be applied to an organic light emitting diode display device, the present invention provides an organic light emitting diode pixel circuit, the driving method thereof and a display panel, the OLED pixel circuit has simple structure and can be easily produced.

To solve the above problem, the present invention provides an organic light emitting diode pixel circuit comprising: a light emitting module, a light emitting control module, a driving module, a threshold compensation module, and a data signal input module; wherein the light emitting module comprises an organic light emitting diode for emitting light;

the light emitting control module is configured for controlling the light emitting module to emit light;

the driving module is configured for driving the light emitting control module, so as to control the light emitting module to emit light;

the threshold compensation module is configured for compensating threshold voltage of the driving module;

the data signal input module is configured for inputting a data signal;

the organic light emitting diode pixel circuit further comprises a touch sensing module and a touch detection module, the touch sensing module is configured for generating a touch sensing signal and outputting the touch sensing signal to the driving module;

the touch detection module is configured for detecting the touch sensing signal from the driving module, and providing an initial voltage for the threshold compensation module;

the driving module further amplifies the touch sensing signal generated by the touch sensing module and then outputs it to the touch detection module.

Preferably, the driving module comprises a first thin film transistor; the gate electrode of the first thin film transistor is connected to a first node, the source electrode and the drain electrode are connected to a second node and a third node respectively; the first node is a connection point of the threshold compensation module and the touch sensing module, the second node is a connection point of the light emitting control module, the threshold compensation module and the touch detection module, the third node is a connection point of the light emitting control module and the data signal input module.

Further preferably, the touch sensing module comprises a seventh thin film transistor and a detection device for touch detection, the gate electrode of the seventh thin film transistor is connected to a first control signal for the preceding row of pixels, the source electrode and the drain electrode of the seventh thin film transistor are connected to the first node and one terminal of the detection device respectively.

Further preferably, the detection device is a photodiode or a sensing capacitor.

Further preferably, the light emitting control module comprises a fourth thin film transistor and a fifth thin film transistor; the gate electrode of the fourth thin film transistor is connected to a second control signal, the source electrode and the drain electrode of the fourth thin film transistor are connected to the light emitting module and the second node respectively, the gate electrode of the fifth thin film transistor is connected to a first control signal for the current row of pixels, the source electrode and the drain electrode of the fifth thin film transistor are connected to the third node and a first power source respectively.

Further preferably, one terminal of the organic light emitting diode of the light emitting module is connected to the source electrode or the drain electrode of the fourth thin film transistor, and the other terminal is connected to a second power supply.

Further preferably, the threshold compensation module comprises a second thin film transistor and a storage capacitor; the gate electrode of the second thin film transistor is connected to a third control signal, the source electrode and the drain of the second thin film transistor are connected to the first node and the second node respectively; the two terminals of the storage capacitor are connected to the first node and the first power source respectively.

Further preferably, the touch detection module comprises a third thin film transistor; the gate electrode of the third thin film transistor is connected to the first control signal for the preceding row of pixels, the source electrode and the drain electrode are connected to the second node and an initial voltage and detection port respectively.

Further preferably, the data signal input module comprises a sixth thin film transistor; the gate electrode of the sixth thin film transistor is connected to the first control signal for the current row of pixels, the source electrode and the drain electrode of the sixth thin film transistor are connected to a data signal and the third node respectively.

Further preferably, the first control signal is a scanning signal.

Further preferably, the first thin film transistor, the second thin film transistor, the third thin film transistor, the fourth thin film transistor, the sixth thin film transistor and the seventh thin film transistor are N-type thin film transistors; the fifth thin film transistor is a P-type thin film transistor.

To solve the technical problems, the present invention provides a display panel comprising the above organic light emitting diode pixel circuit.

To solve the technical problems, the present invention provides a driving method of the organic light emitting diode pixel circuit, the driving method comprises:

an initialization phase, in which the first control signal for the preceding row of pixels is at a high level, the third control signal is at a high level, the initial voltage and detection port supplies an initial voltage, the first control signal for the current row of pixels and the second control signal are at a low level;

an irradiation phase, in which the first control signal for the preceding row of pixels is at a high level, the first control signal for the current row of pixels, the second control signal and the third control signal are at a low level;

a detection phase, in which the first control signal for the preceding row of pixels is at a high level, the first control signal for the current row of pixels, the second control signal and the third control signal are at a low level, the initial voltage and detection port receives a touch sensing signal;

a charging phase, in which the first control signal for the preceding row of pixels is at a high level, the third control signal is at a high level, the initial voltage and detection port supplies an initial voltage, the first control signal for the current row of pixels and the second control signal are at a low level;

a writing phase, in which the first control signal for the current row of pixels is at a high level, and the third control signal is at a high level, the first control signal for the preceding row of pixels and the second control signal are at a low level;

a light emitting phase, in which the second control signal is at a high level, the first control signal for the preceding row of pixels, the first control signal for the current row of pixels and the third control signal are at a low level.

Preferably, the second power supply voltage is higher than the initial voltage, the initial voltage is higher than the maximum data voltage, the maximum data voltage is higher than the minimum data voltage, and the minimum data voltage is higher than the first power supply voltage.

In the OLED pixel circuit, the driving method thereof and the display panel of the present invention, by appropriate design and component sharing of the circuit, touch function can be incorporated with only few addition of components, the OLED pixel circuit thus has simple structure and can be easily implemented.

REFERENCE NUMERALS 11, light emitting module; 12, light emitting control module; 13, driving module; 14, threshold compensation module; 15, touch sensing module; 16, touch detection module; 17, data signal input module; T1, first thin film transistor; T2, second thin film transistor; T3, third thin film transistor; T4, fourth thin film transistor; T5, fifth thin film transistor; T6, sixth thin film transistor; T7, seventh thin film transistor; D1, organic light emitting diode; D2, photodiode; C1, storage capacitor; C2, sensing capacitor; CR2, second control signal; CR3, third control signal; P1, first node; P2, second node; P3, third node; R/V, initial voltage and detection port; Vini, initial voltage; Vs(n), current scanning signal; Vs(n−1), preceding scanning signal; Vdata, data signal; VDD, first power supply voltage; VSS, second power supply voltage; VDH, maximum data voltage; VDL, minimum data voltage.

DETAILED DESCRIPTION OF THE EMBODIMENTS

In order that those skilled in the art better understand the technical solution of the invention, the present invention is further described below in details in conjunction with the accompanying drawings and specific embodiments.

Embodiment 1:

As shown in FIGS. 4 to 7, the present embodiment provides an organic light emitting diode pixel circuit.

The array substrate of the OLED display device comprises a plurality of pixels arranged in array, each pixel is provided with an OLED pixel circuit for controlling the pixel to emit light of a desired color independently.

Figure 4:
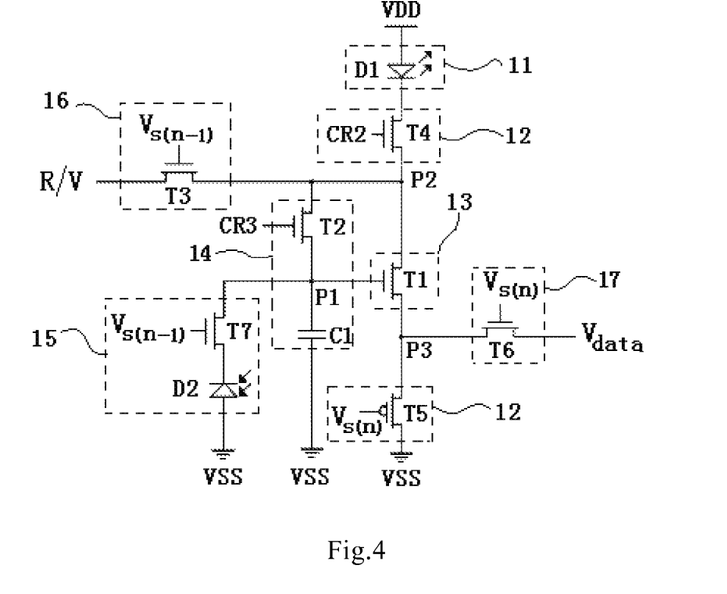
FIG. 4 is a schematic structural view of an organic light emitting diode pixel circuit according to Embodiment 1 of the present invention.
Figure 5:
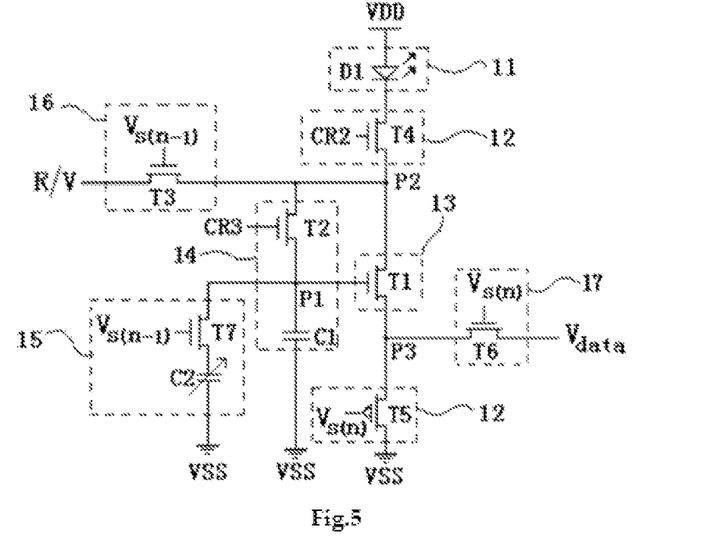
FIG. 5 is a schematic structural view of another organic light emitting diode pixel circuit according to Embodiment 1 of the present invention.

Specifically, as shown in FIGS. 4 and 5, each OLED pixel circuit comprises a light emitting module 11, a light emitting control module 12, a touch sensing module 15, a driving module 13, a touch detection module 16, a threshold compensation module 14, and a data signal input module 17. The light emitting module 11 comprises an organic light emitting diode D1 for emitting light; the light emitting control module 12 is configured for controlling the light emitting module 11 to emit light; the touch sensing module 15 is configured for generating a touch sensing signal and outputting the touch sensing signal to the driving module 13; the driving module 13 is configured for driving the light emitting module 11 to emit light, and amplifying the touch sensing signal generated by the touch sensing module 15 and outputting to the touch detection module 16; the touch detection module 16 is configured for detecting the touch sensing signal from the driving module 13, and providing an initial voltage Vini for the threshold compensation module 14, the initial voltage Vini is provided to set the circuit in a desired initial state, details thereof will be described later; the threshold compensation module 14 is configured for compensating threshold voltage of the driving module 13; the data signal input module 17 is configured for inputting a data signal Vdata.

Preferably, the driving module 13 comprises a first thin film transistor T1; the gate electrode of the first thin film transistor T1 is connected to a first node P1, the source electrode and the drain electrode of the first thin film transistor T1 are connected to a second node P2 and a third node P3 respectively; the first node P1 is a connection point of the threshold compensation module 14 and the touch sensing module 15, the second node P2 is a connection point of the light emitting control module 12, the threshold compensation module 14 and the touch detection module 16, and the third node P3 is a connection point of the light emitting control module 12 and the data signal input module 17.

Obviously, each of the thin film transistors includes three electrodes, i.e. a gate electrode, a source electrode and a drain electrode, wherein the source electrode and the drain electrode are usually defined by the current direction, and there is no difference in structure. Therefore, the expression "other two electrodes" in this embodiment refers to the source electrode and the drain electrode of the thin film transistor, since the current direction in the thin film transistor varies in different phases, the source electrode and the drain electrode are not specifically defined, as long as they are respectively connected to the required points.

Further preferably, the touch sensing module 15 comprises a seventh thin film transistor T7 and a detection device for touch detection, the gate electrode of the seventh thin film transistor T7 is connected to a first control signal for the preceding row of pixels, the source electrode and the drain electrode of the seventh thin film transistor T7 are connected to the first node P1 and the detection device respectively.

In the specification, the expression "connected to certain signal" refers to that a location of the circuit is connected to certain signal line or port, such that the signal line or port can transmit the corresponding signal to the location.

As a preferred mode of the present embodiment, the "first control signal" may be a scanning signal. That is, the scanning signal provided from the gate line may be used as the first control signal, thus no additional signal line is required, and the circuit configuration can be simplified.

The current scanning signal Vs(n) is the signal provided by the gate line for the current row of pixels each including the corresponding circuit, and the preceding scanning signal Vs (n−1) is a signal provided by the gate line for the preceding row of pixels each including the corresponding circuit. When the voltage of the preceding scanning signal Vs (n−1) changes from high level to low level, the current scanning signal Vs(n) changes from low level to high level.

Further preferably, the detection device is a photodiode D2 or a sensing capacitor C2. The detection device is a device which can generate different touch sensing signals depending upon whether touch occurs. The detection device is preferably a photodiode D2 or a sensing capacitor C2, the details thereof will be described hereinafter.

Further preferably, the light emitting control module 12 comprises a fourth thin film transistor T4 and a fifth thin film transistor T5; the gate electrode of the fourth thin film transistor T4 is connected to the second control signal CR2, the other two electrodes of the fourth thin film transistor T4 are connected to the light emitting module 11 and the second node P2 respectively, the gate electrode of the fifth thin film transistor T5 is connected to a first control signal for the current row of pixels, the other two electrodes of the fifth thin film transistor T5 are connected to the third node P3 and the first power supply voltage VSS respectively.

In the specification, the "first power supply voltage VSS" and the "second power supply voltage VDD" refer to two reference voltages for powering the circuit, wherein the second power supply voltage VDD usually is at a high level, i.e. it can be used as an anode, and the first power supply voltage VSS usually is at a low level (e.g., ground), i.e. it can be used as a cathode.

Figure 7:
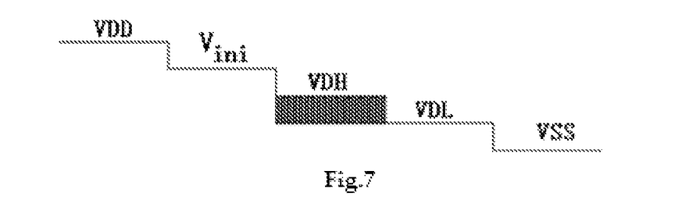
FIG. 7 is a schematic view showing the comparison of the signals levels used in the organic light emitting diode pixel circuit according to Embodiment 1 of the present invention.

Preferably, as shown in FIG. 7, the voltages used in the circuit satisfy the following relationship: the second power supply voltage VDD>the initial voltage Vini>the maximum data voltage VDH>the minimum data voltage VDL>the first power supply voltage VSS.

The "data voltage" refers to the voltage of the data signal Vdata supplied from the data line, the light emission luminance of the pixel unit corresponds to the magnitude of the voltage, thus it is also known as "gray-scale voltage".

Further preferably, one terminal of the organic light emitting diode D1 of the light emitting module 11 is connected to the fourth thin film transistor T4, and the other terminal is connected to the second power supply voltage VDD.

Further preferably, the threshold compensation module 14 comprises a second thin film transistor T2 and a storage capacitor C1; the gate electrode of the second thin film transistor T2 is connected to the third control signal CR3, the source electrode and the drain electrode of the second thin film transistor T2 are connected to the first node P1 and the second node P2 respectively; the two terminals of the storage capacitor C1 are connected to the first node P1 and the first power supply VSS voltage respectively.

Further preferably, the touch detection module 16 comprises a third thin film transistor T3; the gate electrode of the third thin film transistor T3 is connected to a first control signal for the preceding row of pixels, the other two electrodes of the third thin film transistor T3 are connected to the second node P2 and an initial voltage and detection port R/V respectively.

Further preferably, the data signal input module 17 comprises a sixth thin film transistor T6; the gate electrode of the sixth thin film transistor T6 is connected to a first control signal for the current row of pixels, the source electrode and the drain electrode of the sixth thin film transistor T6 are connected to the data signal Vdata and the third node P3 respectively.

Preferably, the first thin film transistor T1, the second thin film transistor T2, the third thin film transistor T3, the fourth thin film transistor T4, the sixth thin film transistor T6 and the seventh thin film transistor T7 are N-type thin film transistors; the fifth thin film transistor T5 is a P-type thin film transistor.

That is, the thin film transistors in the circuit except the fifth thin film transistor T5 are preferably N-type thin film transistors, which is turned on by the gate at a high level, and is turned off by the gate at a low level; while the fifth thin film transistor T5 is a P-type thin film transistor, which is turned off by the gate at a high level, and is turned on by the gate at a low level.

Of course, it should be understood that the above types of the thin film transistors are not limited; the types of the thin film transistors can be changed, provided that the corresponding driving voltage is changed correspondingly.

As opposed to the conventional 6T1C circuit, the organic light emitting diode pixel circuit of the present embodiment makes it possible to incorporate touch function, by only one additional thin film transistor and a detection device, thus the pixel circuit has a simple structure and can be easily implemented. The in cell touch technology is combined with OLED display device in a simple manner.

Figure 6:
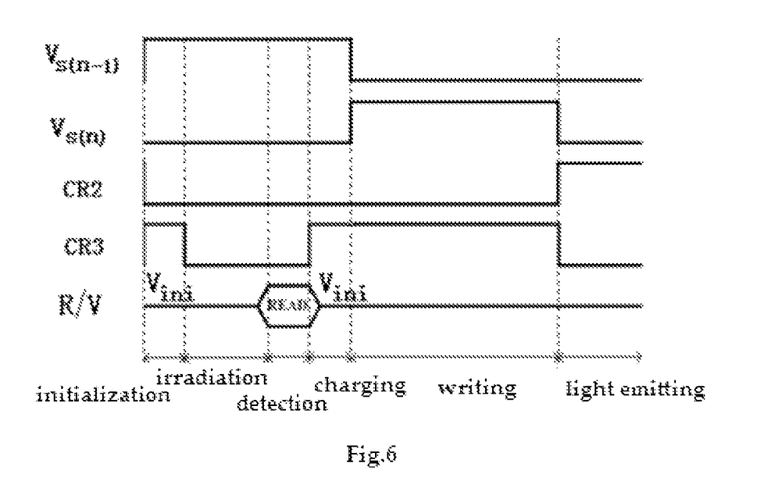
FIG. 6 is a timing chart of the driving signal for the organic light emitting diode pixel circuit according to Embodiment 1 of the present invention.

Next, the driving method of the above-described organic light emitting diode pixel circuit will be further explained. As shown in FIG. 6, the driving method comprises: S01, an initialization phase, in which the preceding scanning signal Vs(n−1) is at a high level, the third control signal CR3 is at a high level, the initial voltage and detection port R/V supplies an initial voltage Vini, the other control signals are at a low level.

At this time, the fourth thin film transistor T4 is turned off, the organic light emitting diode D1 does not emit light; the second thin film transistor T2 and the third thin film transistor T3 are turned on, the initial voltage Vini from the initial voltage and detection port R/V charges the storage capacitor C1, the gate electrode of the first thin film transistor T1 reaches the initial voltage Vini, so that the first thin film transistor T1 enters an amplification state (saturation state).

S02, an irradiation phase, in which the preceding scanning signal Vs(n−1) is at a high level, the other control signals are at a low level.

It should be noted that, at this time the signal supplied from the initial voltage and detection port R/V has no effect on operation of the circuit, thus the signal is not limited here. For easy control, the initial voltage and detection port R/V can continue to provide the initial voltage Vini.

In this phase, the third control signal CR3 changes to be at a low level, the second thin film transistor T2 is turned off, the storage capacitor C1 is no longer charged; then the circuit enters the detection phase.

As shown in FIG. 4, when the detection device is a photodiode D2, if no touch occurs, the photodiode D2 is irradiated by light, leakage current is generated, the storage capacitor C1 is discharged at a fast rate; and if a touch occurs, the light irradiated to the photodiode D2 is blocked, no leakage current or only small leakage current is generated in the photodiode D2, the storage capacitor C1 is not discharged or discharged slowly. In this way, depending upon the touch condition, different voltages (touch sensing signals) are generated on the storage capacitor C1.

As shown in FIG. 5, when the detection device is a sensing capacitor C2, the sensing procedure is different while the principle is similar: if a touch occurs, the capacitance of the sensing capacitor C2 is changed (e.g., caused by a changed distance between the two plates of the capacitor), the voltage on the storage capacitor C1 changes correspondingly; if no touch occurs, the sensing capacitor C2 does not change, the voltage on the storage capacitor C1 is not changed. In this way, depending upon the touch condition, different voltages (touch sensing signals) are generated on the storage capacitor C1.

S03, a detection phase, in which the preceding scanning signal Vs(n−1) is at a high level, the initial voltage and detection port R/V receives a touch sensing signal.

At this time, the third thin film transistor T3 is turned on and the second thin film transistor T2 is turned off, the gate voltage of the first thin film transistor T1 is equal to the voltage on the storage capacitor C1 (i.e., touch sensing signal), whereby the gate voltage of the first thin film transistor T1 can be amplified, the gate voltage of the first thin film transistor T1 can be read by an external reading circuit through the initial voltage and detection port R/V, thus an amplified touch sensing signal is obtained, so as to determine whether a touch occurs.

S04, a charging phase, in which the preceding scanning signal Vs(n−1) is at a high level, the third control signal CR3 is at a high level, the initial voltage and detection port R/V supplies an initial voltage Vini, the other control signals are at a low level.

At this time, the second thin film transistor T2 is turned on again, so that the storage capacitor C1 and the gate of the first thin film transistor T1 are again charged to Vini.

S05, a writing phase, in which the current scanning signal Vs(n) is at a high level, and the third control signal CR3 is at a high level, the other control signals are at a low level.

At this time, the levels of the preceding scanning signal Vs(n−1) and the current scanning signal Vs(n) are reversed, so that the third thin film transistor T3 and the seventh thin film transistor T7 are turned off, the initial voltage and detection port R/V and the detection device are disconnected from the circuit. At this time, the signal from the initial voltage and detection port R/V does not affect operation of the circuit.

Meanwhile, the sixth thin film transistor T6 is turned on, the data signal Vdata (from e.g. the data line) reaches the gate electrode of the first thin film transistor T1 (and also the storage capacitor C1) through the first thin film transistor T1 and the second thin film transistor T2.

Since the maximum data voltage VDH is smaller than the initial voltage Vini (i.e., the voltage on the storage capacitor C1 at this time), the storage capacitor C1 of course discharges through the data line until the voltage reaches: Vdata+Vgs, wherein Vgs is the gate-source voltage of the first thin film transistor T1, the gate-source voltage Vgs at this time is equal to the threshold voltage Vth of the first thin film transistor T1, so the voltage on the storage capacitor C1 (i.e., gate voltage of the first thin film transistor T1) is equal to: Vdata+Vth.

S06, a light emitting phase, in which the second control signal CR2 is at a high level, the other control signals are at a low level.

At this time, except for the second control signal CR2 is at a high level, the other control signals are at a low level, so the sixth thin film transistor T6 and the second thin film transistor T2 are turned off (the data signal Vdata start charging for the other rows of pixels); the fourth thin film transistor T4 and the fifth thin film transistor T5 are turned on, current flows through the organic light emitting diode D1, the organic light emitting diode D1 starts emitting light for display.

At this time, the source of the first thin film transistor T1 is connected to a first power supply voltage VSS, and its gate voltage is: Vdata+Vth, as described previously, so the gate-source voltage Vgs is: Vdata+Vth−VSS. The brightness of the organic light emitting diode D1 is determined by the current flowing through the organic light emitting diode D1, this current is the saturation current It of the first thin film transistor T1, and the formula of the saturation current is:

$$It = k(Vgs - Vth)^2/2$$
$$= k(Vdata + Vth - VSS - Vth)^2/2$$
$$= k(Vdata - VSS)^2/2$$

Obviously, the saturation current It is only associated with the data signal Vdata (the first power supply voltage VSS is constant), and is independent of the threshold voltage Vth of the first thin film transistor T1, so that the above circuit can eliminate threshold voltage drift of the first thin film transistor T1, and perform accurate display.

Embodiment 2:

The present embodiment provides a display panel comprising the above-described organic light emitting diode pixel circuit.

The display panel of the present embodiment includes the above-described organic light emitting diode pixel circuit, thus it has simple structure and touch function, and is easy to implement.

It should be understood that above embodiments are only exemplary embodiments for illustrating the principle of the present invention; however, the present invention is not limited thereto. Various variations and improvements can be made by persons skilled in the art without departing from the spirit and essence of the present invention, and these variations and improvements should also be considered to be within the protection scope of the present invention.

The invention claimed is:

1. An organic light emitting diode pixel circuit comprising: a light emitting module which comprises an organic light emitting diode for emitting light; a light emitting control module comprising a fourth thin film transistor and a fifth thin film transistor, which is configured for controlling the light emitting module to emit light; a driving module comprising a first thin film transistor, which is configured for driving the light emitting control module, so as to control the light emitting module to emit light; a threshold compensation module comprising a second thin film transistor and a storage capacitor, which is configured for compensating threshold voltage of the driving module; and a data signal input module comprising a sixth thin film transistor, which is configured for inputting a data signal;

wherein the organic light emitting diode pixel circuit further comprises:

a touch sensing module, which is configured for generating a touch sensing signal and outputting the touch sensing signal to the driving module, the touch sensing module comprising a seventh thin film transistor and a detection device for touch detection, a gate electrode of the seventh thin film transistor is connected to a first control signal for the preceding row of pixels each including the OLED pixel circuit a source electrode and a drain electrode of the seventh thin film transistor are connected to the first node and one terminal of the detection device respectively; wherein, the first node is a connection point of the threshold compensation module and the driving module;

a touch detection module comprising a third thin film transistor, which is configured for detecting the touch sensing signal from the driving module, and providing an initial voltage for the threshold compensation module;

wherein the driving module amplifies the touch sensing signal generated by the touch sensing module and then outputs it to the touch detection module.

2. The organic light emitting diode pixel circuit according to claim 1, wherein a gate electrode of the first thin film transistor is connected to the first node, a source electrode and a drain electrode of the first thin film transistor are connected to a second node and a third node respectively; the second node is a connection point of the light emitting control module, the threshold compensation module and the touch detection module, and the third node is a connection point of the light emitting control module and the data signal input module.

3. The organic light emitting diode pixel circuit according to claim 2, wherein the detection device is a photodiode or a sensing capacitor, and the other terminal of the detection device is connected to a first power supply.

4. The organic light emitting diode pixel circuit according to claim 2, wherein a gate electrode of the fourth thin film transistor is connected to a second control signal, a source electrode and a drain electrode of the fourth thin film transistor are connected to the light emitting module and the second node respectively, a gate electrode of the fifth thin film transistor is connected to a first control signal for the current row of pixels, a source electrode and a drain electrode of the fifth thin film transistor are connected to the third node and a first power source respectively.

5. The organic light emitting diode pixel circuit according to claim 3, wherein a gate electrode of the fourth thin film transistor is connected to a second control signal, a source electrode and the drain electrode of the fourth thin film transistor are connected to the light emitting module and the second node respectively, a gate electrode of the fifth thin film transistor is connected to a first control signal for the current row of pixels, a source electrode and a drain electrode of the fifth thin film transistor are connected to the third node and a first power supply respectively.

6. The organic light emitting diode pixel circuit according to claim 5, wherein one terminal of the organic light emitting diode of the light emitting module is connected to the source electrode or the drain electrode of the fourth thin film transistor, and the other terminal is connected to a second power source.

7. The organic light emitting diode pixel circuit according to claim 6, wherein the gate electrode of the second thin film transistor is connected to a third control signal, the source electrode and the drain electrode of the second thin film transistor are connected to the first node and the second node respectively; the two terminals of the storage capacitor are connected to the first node and the first power source respectively.

8. The organic light emitting diode pixel circuit according to claim 7, wherein the gate electrode of the third thin film transistor is connected to the first control signal for the preceding row of pixels each including the OLED pixel circuit, the source electrode and the drain electrode of the third thin film transistor are connected to the second node and an initial voltage and detection port respectively.

9. The organic light emitting diode pixel circuit according to claim 8, wherein a gate electrode of the sixth thin film transistor is connected to a first control signal for the current row of pixels each including the OLED pixel circuit, a source electrode and a drain electrode of the sixth thin film transistor are connected to the data signal and the third node respectively.

10. The organic light emitting diode pixel circuit according to claim 9, wherein the first control signal is a scanning signal.

11. The organic light emitting diode pixel circuit according to claim 10, wherein the first thin film transistor, the second thin film transistor, the third thin film transistor, the fourth thin film transistor, the sixth thin film transistor and the seventh thin film transistor are N-type thin film transistors; and the fifth thin film transistor is a P-type thin film transistor.

12. A display panel comprising an organic light emitting diode pixel circuit according to claim 1.

13. The display panel according to claim 12, wherein in the organic light emitting diode pixel circuit, the touch sensing module comprises a seventh thin film transistor and a detection device for touch detection, a gate electrode of the seventh thin film transistor is connected to a first control signal for the preceding row of pixels each including the OLED pixel circuit, a source electrode and a drain electrode of the seventh thin film transistor are connected to the first node and one terminal of the detection device respectively; wherein, the first node is a connection point of the threshold compensation module and the driving module.

14. The display panel according to claim 13, wherein in the organic light emitting diode pixel circuit, the driving module comprises a first thin film transistor; a gate electrode of the first thin film transistor is connected to the first node, a source electrode and a drain electrode of the first thin film transistor are connected to a second node and a third node respectively; the second node is a connection point of the light emitting control module, the threshold compensation module and the touch detection module, and the third node is a connection point of the light emitting control module and the data signal input module.

15. The display panel according to claim 14, wherein in the organic light emitting diode pixel circuit, the detection device is a photodiode or a sensing capacitor, and the other terminal of the detection device is connected to a first power supply.

16. The display panel according to claim 15, wherein in the organic light emitting diode pixel circuit, the light emitting control module comprises a fourth thin film transistor and a fifth thin film transistor; a gate electrode of the fourth thin film transistor is connected to a second control signal, a source electrode and a drain electrode of the fourth thin film transistor are connected to the light emitting module and the second node respectively, a gate electrode of the fifth thin film transistor is connected to a first control signal for the current row of pixels, a source electrode and a drain electrode of the fifth thin film transistor are connected to the third node and a first power source respectively.

17. The display panel according to claim 16, wherein in the organic light emitting diode pixel circuit, one terminal of the organic light emitting diode of the light emitting module is connected to the source electrode or the drain electrode of the fourth thin film transistor, and the other terminal is connected to a second power source.

18. A driving method for an organic light emitting diode pixel circuit of claim 17, the driving method comprising:
an initialization phase, in which the first control signal for the preceding row of pixels is at a high level, the third control signal is at a high level, the initial voltage and detection port supplies an initial voltage, the first control signal for the current row of pixels and the second control signal are at a low level;
an irradiation phase, in which the first control signal for the preceding row of pixels is at a high level, the first control signal for the current row of pixels, the second control signal and the third control signal are at a low level;
a detection phase, in which the first control signal for the preceding row of pixels is at a high level, the first control signal for the current row of pixels, the second control signal and the third control signal are at a low level, the initial voltage and detection port receives a touch sensing signal;
a charging phase, in which the first control signal for the preceding row of pixels is at a high level, the third control signal is at a high level, the initial voltage and detection port supplies an initial voltage, the first control signal for the current row of pixels and the second control signal are at a low level;
a writing phase, in which the first control signal for the current row of pixels is at a high level, and the third control signal is at a high level, the first control signal for the preceding row of pixels and the second control signal are at a low level;
a light emitting phase, in which the second control signal is at a high level, the first control signal for the preceding row of pixels, the first control signal for the current row of pixels and the third control signal are at a low level.

19. The driving method according to claim 18, wherein the second power supply voltage is higher than the initial voltage, the initial voltage is higher than the maximum data voltage, the maximum data voltage is higher than the minimum data voltage, and the minimum data voltage is higher than the first power supply voltage.

* * * * *